US008466231B2

(12) United States Patent
Dadalas et al.

(10) Patent No.: US 8,466,231 B2
(45) Date of Patent: Jun. 18, 2013

(54) PROCESS FOR REMOVING FLUORINATED EMULSIFIER FROM FLUOROPOLYMER DISPERSIONS USING AN ANION-EXCHANGE RESIN AND A PH-DEPENDENT SURFACTANT AND FLUOROPOLYMER DISPERSIONS CONTAINING A PH-DEPENDENT SURFACTANT

(75) Inventors: Michael C. Dadalas, Eggenfelden (DE); Klaus Hintzer, Kastl (DE); Ludwig Mayer, Burgkirchen (DE); Tilman C. Zipplies, Burghausen (DE); James Arthur McDonell, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 459 days.

(21) Appl. No.: 12/420,108

(22) Filed: Apr. 8, 2009

(65) Prior Publication Data

US 2009/0192260 A1 Jul. 30, 2009

Related U.S. Application Data

(62) Division of application No. 11/741,289, filed on Apr. 27, 2007, now abandoned.

(51) Int. Cl.
*C08F 2/16* (2006.01)
*C08F 14/18* (2006.01)
*C08G 18/22* (2006.01)

(52) U.S. Cl.
USPC ........ 524/800; 524/544; 524/545; 525/326.2; 428/421

(58) Field of Classification Search
USPC . 524/520, 544, 545, 800; 525/326.2; 428/421
See application file for complete search history.

(56) References Cited

U.S. PATENT DOCUMENTS

| 2,516,127 | A | 7/1950 | Lauer et al. |
|---|---|---|---|
| 2,559,752 | A | 7/1951 | Berry |
| 3,142,665 | A | 7/1964 | Cardinal et al. |
| 3,271,341 | A | 9/1966 | Garrison, Jr. |
| 3,451,908 | A | 6/1969 | Sianesi et al. |
| 3,555,100 | A | 1/1971 | Garth et al. |
| 3,635,926 | A | 1/1972 | Gresham et al. |
| 3,642,742 | A | 2/1972 | Carlson |
| 3,721,696 | A | 3/1973 | Sianesi et al. |
| 3,816,524 | A | 6/1974 | Grinstead |
| 3,855,191 | A | 12/1974 | Doughty, Jr. et al. |
| 3,882,153 | A | 5/1975 | Seki et al. |
| 3,997,599 | A | 12/1976 | Grinstead |
| 4,005,137 | A | 1/1977 | Rudolph et al. |
| 4,010,156 | A | 3/1977 | Nudelman et al. |
| 4,025,709 | A | 5/1977 | Blaise et al. |
| 4,060,535 | A | 11/1977 | Cinco |
| 4,138,373 | A | 2/1979 | Ukihashi et al. |
| 4,262,101 | A | 4/1981 | Hartwimmer et al. |
| 4,282,162 | A | 8/1981 | Kuhls |
| 4,320,205 | A | 3/1982 | Asawa et al. |
| 4,369,266 | A | 1/1983 | Kuhls et al. |
| 4,380,618 | A | 4/1983 | Khan et al. |
| 4,381,384 | A | 4/1983 | Khan |
| 4,439,385 | A | 3/1984 | Kuhls et al. |
| 4,588,796 | A | 5/1986 | Wheland |
| 4,603,118 | A | 7/1986 | Staab |
| 4,605,773 | A | 8/1986 | Maloney et al. |
| 4,609,497 | A | 9/1986 | Cope |
| 4,618,641 | A | 10/1986 | Hengel |
| 4,621,116 | A | 11/1986 | Morgan |
| 4,623,487 | A | 11/1986 | Cope |
| 4,639,337 | A | 1/1987 | Cope et al. |
| 4,789,717 | A | 12/1988 | Giannetti et al. |
| 4,847,135 | A | 7/1989 | Braus et al. |
| 4,861,845 | A | 8/1989 | Slocum et al. |
| 4,864,006 | A | 9/1989 | Giannetti et al. |
| 4,925,709 | A | 5/1990 | Shmueli |
| 4,987,254 | A | 1/1991 | Schwertfeger et al. |
| 5,017,480 | A | 5/1991 | Mori et al. |
| 5,075,397 | A | 12/1991 | Tonelli et al. |
| 5,090,613 | A | 2/1992 | Lee |
| 5,285,002 | A | 2/1994 | Grootaert |
| 5,312,935 | A | 5/1994 | Mayer et al. |
| 5,442,097 | A | 8/1995 | Obermeier et al. |
| 5,453,477 | A | 9/1995 | Oxenrider et al. |
| 5,498,680 | A | 3/1996 | Abusleme et al. |
| 5,530,078 | A | 6/1996 | Felix et al. |
| 5,532,310 | A | 7/1996 | Grenfell et al. |
| 5,591,877 | A | 1/1997 | Obermeier et al. |
| 5,628,911 | A | 5/1997 | Kowallik et al. |
| 5,656,201 | A | 8/1997 | Visca et al. |
| 5,663,255 | A | 9/1997 | Anolick et al. |
| 5,688,884 | A | 11/1997 | Baker et al. |
| 5,698,635 | A | 12/1997 | Kruger et al. |
| 5,710,205 | A * | 1/1998 | Davies et al. ................ 524/502 |
| 5,763,552 | A | 6/1998 | Feiring et al. |
| 5,789,508 | A | 8/1998 | Baker et al. |
| 5,955,556 | A | 9/1999 | McCarthy et al. |
| 5,990,330 | A | 11/1999 | Sulzbach et al. |

(Continued)

FOREIGN PATENT DOCUMENTS

| BE | 834885 | 4/1976 |
|---|---|---|
| DE | 38 28 063 | 2/1990 |

(Continued)

OTHER PUBLICATIONS

Apostolo et al., "Microemulsion Polymericzation for Producing Fluorinated Structured Materials," Macromolecule Symposium, vol. 206 (2004) p. 347-360.

(Continued)

*Primary Examiner* — Hannah Pak
(74) *Attorney, Agent, or Firm* — C. Michael Geise

(57) ABSTRACT

A process of reducing the amount of fluorinated emulsifiers in fluoropolymer dispersions by contacting the fluoropolymer dispersion with an anion exchange resin in the presence of a pH-dependent surfactant, and fluoropolymer dispersion containing the pH-dependent surfactant and uses thereof.

3 Claims, No Drawings

U.S. PATENT DOCUMENTS

| | | | |
|---|---|---|---|
| 6,013,795 A | 1/2000 | Manzara et al. | |
| 6,025,441 A | 2/2000 | Koshirai et al. | |
| 6,103,844 A | 8/2000 | Brothers | |
| 6,136,893 A | 10/2000 | Yamashita et al. | |
| 6,245,923 B1 | 6/2001 | Sulzbach et al. | |
| 6,255,384 B1 | 7/2001 | McCarthy et al. | |
| 6,255,536 B1 | 7/2001 | Worm et al. | |
| 6,365,684 B1 | 4/2002 | McCarthy et al. | |
| 6,395,848 B1 | 5/2002 | Morgan et al. | |
| 6,429,258 B1 | 8/2002 | Morgan et al. | |
| 6,436,244 B1 | 8/2002 | Fuhrer et al. | |
| 6,482,979 B1 | 11/2002 | Hintzer et al. | |
| 6,503,988 B1 | 1/2003 | Kitahara et al. | |
| 6,512,063 B2 | 1/2003 | Tang | |
| 6,512,089 B1 | 1/2003 | Hintzer et al. | |
| 6,518,442 B1 | 2/2003 | Felix et al. | |
| 6,576,703 B2 | 6/2003 | Kapeliouchko et al. | |
| 6,593,416 B2 | 7/2003 | Grootaert et al. | |
| 6,613,941 B1 | 9/2003 | Felix et al. | |
| 6,642,415 B1 | 11/2003 | Fuhrer et al. | |
| 6,693,152 B2 | 2/2004 | Kaspar et al. | |
| 6,703,520 B2 | 3/2004 | Hintzer et al. | |
| 6,706,193 B1 | 3/2004 | Burkard et al. | |
| 6,715,877 B2 | 4/2004 | Molebny | |
| 6,720,437 B2 | 4/2004 | Jones et al. | |
| 6,729,437 B1 | 5/2004 | Apple | |
| 6,750,304 B2 | 6/2004 | Kaspar et al. | |
| 6,774,164 B2 | 8/2004 | Lyons et al. | |
| 6,774,166 B1 | 8/2004 | Eichenauer et al. | |
| 6,825,250 B2 * | 11/2004 | Epsch et al. | 523/310 |
| 6,833,403 B1 | 12/2004 | Bladel et al. | |
| 6,861,466 B2 | 3/2005 | Dadalas et al. | |
| 6,861,490 B2 | 3/2005 | Kaspar et al. | |
| 6,878,772 B2 | 4/2005 | Visca et al. | |
| 6,972,094 B2 | 12/2005 | Ichida et al. | |
| 7,018,541 B2 | 3/2006 | Hintzer et al. | |
| 7,019,163 B2 | 3/2006 | Uematsu et al. | |
| 7,041,728 B2 * | 5/2006 | Zipplies et al. | 524/544 |
| 7,045,571 B2 | 5/2006 | Tan et al. | |
| 7,045,591 B2 | 5/2006 | Chen et al. | |
| 7,074,862 B2 | 7/2006 | Kaspar et al. | |
| 7,125,941 B2 | 10/2006 | Kaulbach et al. | |
| 7,126,016 B2 | 10/2006 | Fu et al. | |
| 7,141,620 B2 | 11/2006 | Hoshikawa et al. | |
| 7,294,276 B2 | 11/2007 | Malvasi et al. | |
| 7,358,296 B2 | 4/2008 | Bladel et al. | |
| 2001/0020063 A1 | 9/2001 | Kapeliouchko et al. | |
| 2001/0027240 A1 | 10/2001 | Okanishi et al. | |
| 2002/0040119 A1 | 4/2002 | Tang | |
| 2002/0062161 A1 | 5/2002 | Dusterhoft | |
| 2002/0114421 A1 | 8/2002 | Erbes et al. | |
| 2002/0139593 A1 | 10/2002 | Charaudeau et al. | |
| 2002/0193500 A1 | 12/2002 | Hintzer et al. | |
| 2002/0198334 A1 | 12/2002 | Kaspar et al. | |
| 2003/0018148 A1 | 1/2003 | Kaspar et al. | |
| 2003/0032748 A1 | 2/2003 | Hintzer et al. | |
| 2003/0153674 A1 | 8/2003 | Visca et al. | |
| 2003/0181572 A1 | 9/2003 | Tan et al. | |
| 2003/0220442 A1 | 11/2003 | Epsch et al. | |
| 2004/0010156 A1 | 1/2004 | Kondo et al. | |
| 2004/0016742 A1 | 1/2004 | Miyazaki | |
| 2004/0072977 A1 | 4/2004 | Kaulbach et al. | |
| 2004/0087703 A1 | 5/2004 | Kaspar et al. | |
| 2004/0101561 A1 | 5/2004 | Jafari et al. | |
| 2004/0116742 A1 | 6/2004 | Guerra | |
| 2004/0131782 A1 | 7/2004 | Hasei et al. | |
| 2004/0132939 A1 | 7/2004 | Kaspar et al. | |
| 2004/0143052 A1 | 7/2004 | Epsch et al. | |
| 2004/0186219 A1 | 9/2004 | Dadalas et al. | |
| 2004/0235986 A1 | 11/2004 | Kaspar et al. | |
| 2005/0000904 A1 | 1/2005 | Le Bec | |
| 2005/0038177 A1 | 2/2005 | Hoshikawa et al. | |
| 2005/0043471 A1 | 2/2005 | Epsch et al. | |
| 2005/0070633 A1 | 3/2005 | Epsch et al. | |
| 2005/0090601 A1 | 4/2005 | Dadalas et al. | |
| 2005/0090613 A1 | 4/2005 | Maruya et al. | |
| 2005/0107506 A1 | 5/2005 | Kapeliouchko et al. | |
| 2005/0113507 A1 | 5/2005 | Bladel et al. | |
| 2005/0150833 A1 | 7/2005 | Funaki et al. | |
| 2005/0154104 A1 | 7/2005 | Malvasi et al. | |
| 2005/0171381 A1 | 8/2005 | Fu et al. | |
| 2005/0173347 A1 | 8/2005 | Hintzer et al. | |
| 2005/0177000 A1 | 8/2005 | Fuhrer et al. | |
| 2005/0192397 A1 | 9/2005 | Dadalas et al. | |
| 2005/0228127 A1 * | 10/2005 | Tatemoto et al. | 524/805 |
| 2006/0014886 A1 | 1/2006 | Hintzer et al. | |
| 2006/0041051 A1 | 2/2006 | Nakatani et al. | |
| 2006/0074178 A1 | 4/2006 | Auyeung et al. | |
| 2006/0160947 A1 | 7/2006 | Tan et al. | |
| 2006/0281946 A1 | 12/2006 | Morita et al. | |
| 2007/0015937 A1 | 1/2007 | Hintzer et al. | |
| 2007/0027251 A1 | 2/2007 | Hintzer et al. | |
| 2007/0117915 A1 | 5/2007 | Funaki et al. | |
| 2007/0135558 A1 | 6/2007 | Tsuda et al. | |
| 2007/0149733 A1 | 6/2007 | Otsuka et al. | |
| 2007/0155891 A1 | 7/2007 | Tsuda et al. | |
| 2007/0282055 A1 | 12/2007 | Teter et al. | |
| 2008/0264864 A1 | 10/2008 | Dadalas et al. | |

FOREIGN PATENT DOCUMENTS

| | | |
|---|---|---|
| EP | 0 030 663 | 10/1983 |
| EP | 0 222 945 | 5/1987 |
| EP | 0 649 863 | 4/1995 |
| EP | 0 822 226 | 2/1998 |
| EP | 0 861 856 | 9/1998 |
| EP | 0 964 009 | 12/1999 |
| EP | 1 069 078 | 1/2001 |
| EP | 1 084 097 | 3/2001 |
| EP | 1 093 441 | 4/2001 |
| EP | 1 155 055 | 4/2003 |
| EP | 1334996 | 8/2003 |
| EP | 1 514 848 | 3/2005 |
| EP | 1 529 785 | 5/2005 |
| EP | 1 676 868 | 7/2006 |
| FR | 814839 | 6/1937 |
| GB | 1 127 521 | 9/1968 |
| GB | 1 473 447 | 5/1977 |
| JP | 46-11031 | 8/1966 |
| JP | 2002-308914 | 10/2002 |
| JP | 2002-317003 | 10/2002 |
| JP | 2003-119204 | 4/2003 |
| JP | 2003-212919 | 7/2003 |
| JP | 2003-284921 | 10/2003 |
| JP | 2004-358397 | 12/2004 |
| JP | 2004-359870 | 12/2004 |
| JP | 2005-008775 | 1/2005 |
| JP | 2005-105045 | 4/2005 |
| RU | 2158274 | 10/2000 |
| WO | WO 96/24622 | 8/1996 |
| WO | WO 97/17381 | 5/1997 |
| WO | WO 99/62830 | 12/1999 |
| WO | WO 99/62858 | 12/1999 |
| WO | WO 00/35971 | 6/2000 |
| WO | WO 01/32563 | 5/2001 |
| WO | WO 01/57096 | 8/2001 |
| WO | WO 02/088203 | 11/2002 |
| WO | WO 02/088206 | 11/2002 |
| WO | WO 02/088207 | 11/2002 |
| WO | WO 02/088248 | 11/2002 |
| WO | WO 03/051988 | 6/2003 |
| WO | WO 2005/065800 | 7/2005 |
| WO | WO 2005/082785 | 9/2005 |
| WO | WO 2005/121290 | 12/2005 |
| WO | WO 2006/020721 | 2/2006 |
| WO | WO 2006/135825 | 12/2006 |

OTHER PUBLICATIONS

Chi, K., et al., "A Facile Synthesis of Partly-fluorinated Ethers Using Perfluoropropoxyethylene and Aliphatic Alcohols" *Bull. Korean Chem. Soc.*, vol. 20, No. 2, pp. 220-222 [1999].

Encyclopedia of Chemical Technology, Kirk-Othmer, Third Edition, John Wiley & Sons, vol. 13, p. 687 (1981).

Encyclopedia of Polymer Science and Engineering, John Wiley & Sons, vol. 8, p. 347 (1987).

England, D. C., "Catalytic Conversion of Fluoroalkyl Alkyl Ethers to Carbonyl Compounds", *J. Org. Chem.* vol. 49, pp. 4007-4008 (1984).

Lampert, D.J. et al., Removal of Perfluorooctanoic Acid and Perfluorooctane Sulfonate from Wastewater by Ion Exchange, Practice Periodical of Hazardous, Toxic and Radioactive Waste Management, Jan. 2007, pp. 60-68, vol. 11, No. 1.

Mark, et al., Encyclopedia of Polymer Science and Engineering, John Wiley & Sons, vol. 16, p. 580 (1989).

Modern Fluoropolymers, High Performance Polymers for Diverse Applications, edited by John Scheirs (ed), John Wiley & Sons (1997).

Tosler et al., "Ethoxylated Alkyl Amines," Handbook of Detergents, published by CRC Press, (1999) p. 26-27.

* cited by examiner

PROCESS FOR REMOVING FLUORINATED EMULSIFIER FROM FLUOROPOLYMER DISPERSIONS USING AN ANION-EXCHANGE RESIN AND A PH-DEPENDENT SURFACTANT AND FLUOROPOLYMER DISPERSIONS CONTAINING A PH-DEPENDENT SURFACTANT

CROSS REFERENCE TO RELATED APPLICATION

This application is a divisional of U.S. application Ser. No. 11/741,289, filed Apr. 27, 2007 now abandoned the entirety of which is herein incorporated by reference.

TECHNICAL FIELD

The present invention relates to a process of reducing the amount of fluorinated emulsifier in fluoropolymer dispersions using anion exchange resins in the presence of one or more pH-dependent surfactants. The invention also relates to fluoropolymer dispersions containing the pH-dependent surfactants but containing no or only low amounts of fluorinated emulsifiers, and to uses of these dispersions.

BACKGROUND

Fluoropolymers, i.e. polymers having a fluorinated backbone, have been long known and used in a various applications because of their desirable properties such as heat resistance, chemical resistance, weatherability, UV-stability etc. Various fluoropolymers are for example described in "Modern Fluoropolymers", edited by John Scheirs (ed), Wiley Science 1997. The fluoropolymers may have a partially fluorinated backbone, generally at least 40% by weight fluorinated, or a fully fluorinated backbone. Particular examples of fluoropolymers include polytetrafluoroethylene (PTFE), copolymers of tetrafluoroethylene (TFE) and hexafluoropropylene (HFP), typically referred to as FEP, perfluoroalkoxy copolymers (PFA), ethylene-tetrafluoroethylene (ETFE) copolymers, terpolymers of tetrafluoroethylene, hexafluoropropylene and vinylidene fluoride (THV) and polyvinylidene fluoride polymers (PVDF).

The fluoropolymers may be used to coat or impregnate substrates to provide desirable properties thereto such as for instance chemical resistance, weatherability, water- and oil repellence, lubricity etc. For example, aqueous dispersions of fluoropolymers may be used to coat or impregnate substrates such as metals, fabrics, textiles, glass fibers or paper.

A frequently used method for producing aqueous dispersions of fluoropolymers involves aqueous emulsion polymerization of one or more fluorinated monomers. Usually, one or more concentration steps follow the polymerization reaction to increase the content of solids in the raw dispersion. The aqueous emulsion polymerization of fluorinated monomers generally involves the use of an emulsifier. Typically, the emulsifiers are perfluorinated anionic surfactants. The fluorinated emulsifier stabilises the fluoropolymer in the aqueous medium and prevents the fluoropolymer from coagulating in the dispersion. Typical examples of fluorinated emulsifiers are perfluorinated carboxylic acids, such as, for example, perfluorooctanoic acids and salts thereof, in particular ammonium perfluorooctanoic acid (APFO). Fluorinated emulsifiers are generally expensive compounds and in several cases fluorinated emulsifiers have been found to be poorly biodegradable. Accordingly, measures have been taken to remove fluorinated emulsifiers from the aqueous fluoropolymer dispersions.

WO 00/35971 describes a method in which the amount of fluorinated emulsifier in aqueous dispersions is reduced by contacting the dispersion with an anion exchange resin to which the (anionic) fluorinated emulsifier binds. Non-ionic surfactants are added to the dispersion prior to the ion-exchange to stabilise the fluoropolymer in the dispersion in the absence of the fluorinated emulsifier. The resulting emulsifier-free or emulsifier-reduced fluoropolymer dispersions can be conveniently used in applications where the fluoropolymers are applied to a substrate directly from the dispersion.

However, in certain applications where the fluoropolymer is not applied to a substrate directly from the dispersion, for example, where the fluoropolymer is applied as a coagulum, e.g. as a paste or solid, it may be desirable to avoid or at least to reduce the presence of non-ionic surfactants. In these applications the fluoropolymer is separated from the dispersion prior to application to the substrate which is typically done by destabilising the dispersion and separating the fluoropolymer from the aqueous medium (also referred to as phase-separation or coagulation). Non-ionic surfactants, however, have been observed to prevent or inhibit the phase separation when using common phase separation techniques such as, for example, salting out (i.e. increasing the ionic strength of the dispersion by adding salts or acids), shear force-induced coagulation, or solvent-induced coagulation (e.g. adding organic solvents). Instead of the formation of distinct phases, a fluoropolymer phase and a water phase, slurries are often contained. If the fluoropolymers can be collected from those poorly phase-separated mixtures at all, they typically contain rather large amounts of residual non-ionic surfactants and water, the presence of which impacts on the physical properties of coatings prepared from these poorly phase-separated fluoropolymers. For example, due to the presence of the surfactants the fluoropolymer coating may adsorb water, for instance from ambient humidity, leading to poor properties as regards, for example, surface hardness, water resistance, self-lubrication or friction-resistance etc.

SUMMARY OF THE INVENTION

There is a desire to provide a process for removing fluorinated emulsifiers from fluoropolymer dispersions using surfactants that stabilise the dispersion but are easily removable from the dispersion and/or allow for a good or complete separation of the fluoropolymer from the dispersion by phase separation (coagulation).

Additionally, there is a need to provide stable aqueous fluoropolymer dispersions containing no or only very low amounts of fluorinated surfactants allowing effective and easy coagulation of the fluoropolymer.

Furthermore, there is a need to provide fluoropolymers coagulated from aqueous dispersions containing low amounts of fluorinated surfactants and low amounts of non-ionic surfactants.

In the following there is provided a process for reducing the amount of fluorinated emulsifier in a fluoropolymer dispersion. The process comprising contacting the dispersion with an anion exchange resin in the presence of a pH-dependent surfactant. The pH-dependent surfactant attains either a cationic or a non-ionic form, depending on the pH of the dispersion in which it is present. The pH-dependent surfactant is capable of stabilising the dispersion when the surfactant is in its non-ionic form. The dispersion is contacted with the anion exchange resin at a pH at which the surfactant is in its non-ionic form.

In another aspect, there is provided an aqueous fluoropolymer dispersion comprising:
  i) from about 5% to about 70% by weight based on the weight of the dispersion of a fluoropolymer, and
  ii) at least about 0.02% by weight based on the solid content of the dispersion of the pH-dependent surfactant.

Furthermore, there is provided a process of preparing a composition containing a coagulated fluoropolymer said process comprising:
  i) providing an aqueous fluoropolymer dispersion containing:
    a) from about 5% to about 70% by weight based on the weight of the dispersion of a fluoropolymer, and
    b) at least about 0.02% by weight based on the solid content of the dispersion of the pH-dependent surfactant and wherein the dispersion has a pH at which the surfactant is in its non-ionic form;
  ii) reducing the pH of the dispersion to a level at which the surfactant is in its cationic form,
  iii) coagulating the dispersion.

Additionally, there are also provided electrodes or bearings comprising the coagulated fluoropolymers obtainable by the process described above.

DETAILED DESCRIPTION OF THE INVENTION

The Fluoropolymers

The fluoropolymer dispersions from which the fluorinated emulsifier is to be removed or in which the amount thereof is to be reduced can originate from any source but are typically aqueous fluoropolymer dispersions obtained by the emulsion polymerization with fluorinated emulsifiers. The preparation of aqueous fluoropolymer dispersions is known in the art and are described, for example, in EP 0 030 663 or U.S. Pat. No. 3,142,665, incorporated herein by reference. Typically, the raw dispersion, i.e. the dispersion directly obtained after emulsion polymerization, comprises between about 5% and about 35% by weight of fluoropolymer. Concentrated dispersions, i.e. dispersions having a fluoropolymer content of from about 35% and to about 70% by weight, are usually obtained in a separate concentration step by concentrating the raw dispersion, e.g. by ultrafiltration, evaporation, thermal decantation or electrodecantation.

The fluoropolymers contained in the dispersions described herein include melt-processable as well as non-melt-processible fluoropolymers.

Examples of non-melt processable fluoropolymers include polytetrafluoroethylene (PTFE) and so-called modified PTFE, which is a polymer of tetrafluoroethylene modified or copolymerized with minor amounts, e.g. up to or less than 1% wt based on PTFE of another fluorinated monomer such as, for example, hexafluoropropylene or a perfluorinated vinyl ether.

Melt-processible fluoropolymers include so-called fluorothermoplasts. Fluorothermoplasts typically have a distinct melting point.

Still further, the fluoropolymer may comprise a so-called micro-powder, typically a low molecular weight polytetrafluoroethylene. Due to the low molecular weight of the PTFE, micro-powders are melt processible.

The fluoropolymers of the dispersion may also be amorphous, including those that upon curing result fluoroelastomers. Fluoroelastomers have elastomeric properties. This means the polymer can be extended and retains its original length when the force necessary to extend the polymer is no longer applied. Typically, amorphous fluoropolymers have no melting point or have no distinct melting point.

Examples of suitable fluoropolymers include polymers based on tetrafluorethylene (TFE), such as TFE homopolymers (PTFE) or TFE copolymers. TFE copolymers may be copolymers with monomers containing at least one unsaturated carbon-carbon functionality. These monomers may be not fluorinated such as, eg, ethylene (E) or propylene (P), or they may be fluorinated, such as vinylidene fluoride (VDF), hexafluoropropylene (HFP) or both. Other examples of suitable fluoropolymers are VDF-based homopolymers or copolymers, chlorotrifluoroethylene (CTFE)-based homopolymers or copolymers. Further examples are modified PTFE, micro-powder, copolymers of VDF and perfluorovinyl ether (PVE), copolymers of TFE, E and/or P and PVE, copolymers of TFE, HFP and PVE, copolymers of TFE, VDF and HFP and optionally CTFE, copolymers of VDF, TFE and PVE, copolymers of TFE, E or P, HFP and PVE or mixtures thereof.

The particle size of the fluoropolymer in the aqueous fluoropolymer dispersion is typically between 50 nm and 400 nm (number average diameter). Smaller particle sizes are contemplated as well, for example between 20 nm and 50 nm, which may typically be obtained by microemulsion polymerization techniques.

The dispersion may be monomodal, bimodal or multimodal with respect to particle sizes, molecular weight distribution and/or average molecular weight. Such a dispersion may contain fluoropolymers of the same or different chemical composition, for example one component may be a non melt-processible polymer and the other component may be a thermoplast.

An example of a dispersion that is bimodal with respect to particle size is a dispersion containing a first fluoropolymer having an average particle size (number average) of greater than 200 nm and a second fluoropolymer having a particle size (number average) of less than 100 nm. The fluoropolymer may also be in the form of core-shell particles. Core-shell particles include particles of which an inner layer (core) comprises a fluoropolymer that has a different chemical composition and or molecular weight compared to the polymer in the outer layer of the particles. To produce core-shell particles, the corresponding monomer or monomer mixture that is to form the shell is added at the final stage of the polymerization. The final polymerization stage is typically defined as the stage during which the last 25% by weight or less of polymer solids are produced. In a particular embodiment, the shell may constitute not more than 20% by weight or not more than 15% by weight of the particle weight. Examples for the preparation of core-shell polymers are described, for instance, in EP 1 529 785 or EP 0 030 663.

The Fluorinated Emulsifier

Typically, aqueous fluoropolymer dispersions are prepared using emulsifiers. The fluorinated emulsifier used in aqueous emulsion polymerization is typically an anionic fluorinated surfactant. Commonly used fluorinated surfactants are non-telogenic and include those that correspond to the formula (I):

i) (Y—$R_f$—Z)n-M,            (I)

wherein Y represents hydrogen, Cl or F; $R_f$ represents a linear or branched perfluorinated alkylene having 4 to 10 carbon atoms; Z represents $COO^-$ or $SO_3^-$; M represents a cation including monovalent and multivalent cations, e.g. an alkali metal ion, an ammonium ion or a calcium ion and n corresponds to the valence of M and typically has a value of 1, 2 or 3.

Representative examples of fluorinated emulsifiers according to above formula (I) are perfluoroalkanoic acids and salts thereof such as perfluorooctanoic acid and its salts, in particular ammonium salts, such as ammonium perfluoro octanoic acid (APFO).

Other fluorinated emulsifiers which may be used in aqueous polymerization of fluoropolymers include fluorinated carboxylic acids or salts thereof corresponding to the general formula (II):

i) $[R_f\text{—}O\text{-}L\text{-}COO^-]_i X^{i+}$ (II)

wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3. Examples of cations include $H^+$, ammonium, monovalent metal cations, divalent metal cations and trivalent cations. Typical cations are $H^+$ $K^+$, $Na^+$ and $NH_4^+$.

For the sake of convenience, the term 'fluorinated carboxylic acid' is hereinafter used to indicate the free acid as well as salts thereof. Generally, the fluorinated carboxylic acid are low molecular weight compounds, for example a compound having a molecular weight for the anion part of the compound of not more than 1000 g/mol, typically not more than 600 g/mol and in particular embodiments, the anion of the fluorinated carboxylic acid may have a molecular weight of not more than 500 g/mol.

Fluorinated emulsifiers of this type are described in great detail in US 2007/0015937 by Hintzer et al, which is incorporated herein by reference. All fluorinated emulsifiers and in particular the individual compounds described in US 2007/0015937 may be used in this invention.

The pH-Dependent Surfactant

The process of removing the fluorinated emulsifier is carried out in the presence of a pH-dependent surfactant (or a mixture thereof). A pH-dependent surfactant is understood to mean a surfactant that attains either a non-ionic or a cationic form depending on the pH of the environment at which it is present. Non-ionic form means the surfactant molecule does not contain an ionic group, i.e. a positively or negatively charged group. Cationic form means the surfactant molecule has one or more, preferably one or two cationic groups.

Preferably, the surfactant is cationic at a pH of or below about 6.0 or at a pH of or below about 5.0 or of or below about pH 4.0. Preferably, the surfactant is non-ionic at a pH of or above about 7.0, at a pH of or above about 8.0 or at a pH of or above about 9.0. For example, the surfactant may be cationic at a pH of or below about 4 and non-ionic at a pH of or above 11.

The surfactant is capable of stabilising the fluoropolymer dispersion when the dispersion is at a pH at which the surfactant is in its non-ionic form.

The surfactant is not capable of stabilising the fluoropolymer dispersion when it is in its cationic form or it is less capable compared to it being in the non-ionic form. This may be because the pH-dependent surfactant is less surface active at a pH at which it is in its cationic form than at a pH at which its is in its non-ionic form. The surfactant may also have no surface activity at a pH at which it is in its cationic form. The surfactant may also be incapable or less capable of stabilisation when being in the cationic form because it may be susceptible to de-aggregation by increasing the ionic strength of the dispersion (i.e. adding soluble salts or acids to the dispersion), which may result in the precipitation of the surfactant or to its concentration in the aqueous phase falling below its critical micelle concentration (cmc), i.e. the concentration at which the surfactant becomes surface active. Surface activity is the capability of a surfactant to reduce the surface tension of water. It can be measured according to standard procedures, for example using the ring method (cf DIN 53914:1980-03).

Examples of suitable pH-dependent surfactants include primary, secondary or tertiary amines or polyamines of appropriate structure to have surface activity when being in the non-ionic form and having reduced surface activity when being in the cationic form. The amines are capable of abstracting a proton from an acid to form a salt by which the amines are converted in the cationic form. Preferably, the amines are tertiary amines or polyamines containing at least one tertiary amine moiety with at least one of the three residues of the tertiary amine being a polyoxy alkyl residue and the remaining residue(s) being a non-polar residue.

The non-polar residues may be, for example, saturated or non-saturated, linear, branched or cyclic alkyls, alkylaryls, alkyl ethers, aryl ethers, alkylaryl ethers, alkyl esters, aryl esters, alkylaryl esters or silicones. Preferred non-polar residues are branched, linear or cyclic alkyl residues, preferably comprising more than 8 and less than 30, more preferably more than 10 and less than 20, and most preferably between 12 and 18 C atoms.

The polyoxy alkyl residues may be linear or branched, substituted or non-substituted, wherein substituted means the residue bears further moieties, such as alkyl residues, alkoxy residues, alkyl amines, amino groups, halogen groups, hydroxyl groups, ester groups, thiol group, aromatic groups etc. Preferred polyoxy alkyl residues include ethoxylates or propoxylates or combinations thereof.

Suitable amine ethoxylates include those corresponding to the general formulae (III) or (IV):

i)

ii)

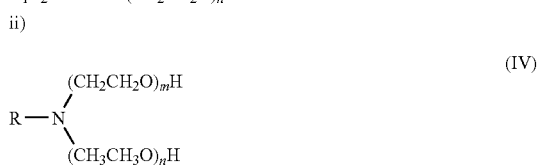

with $R_1$, $R_2$ and R being a non-polar residue, such as being independent from each other a branched, linear or cyclic alkyl, alkyloxy or polyoxy alkyl residue. Each non polar residue may comprise, independent from each other, 4 or more, 6 or more, 8 or more and less than 30, more preferably more than 10 and less than 20, most preferably between 6 and 18 C atoms. In some embodiments one or more of the residues $R_1$, $R_2$ or R may be alkyl-substituted (preferably with a methyl or ethyl group) in the 1-position (i.e. the position adjacent to the N-atom) or di-alkyl-substituted in the 1-position.

In formulae (III) and (IV) n and m represent an integer and being independently from each other 1, 2, 3, 4, 5, 6, 7, 8, 9, 10, 11, 12, 13 or 14 or 1 to 10, to 6 or 1 to 4. Preferably, the sum of n and m may be less than 30, more preferably less than 25, most preferably less than 20. The sum of n and m may also be 2, 3, 4, 5, 8, 10, 12, 20 or 25.

The total number of C-atoms in the molecule may be less than 50 or less than 40.

In one embodiment one or more residues of the tertiary amine linked to the N-atom may correspond to the formula (V):

i) R'—(OCH$_2$—CR''H)$_x$—     (V)

with R' being hydrogen, a branched, linear or cyclic alkyl or aryl residue and R'' being hydrogen or an alkyl group including, for example, a methyl, ethyl, propyl, isopropyl, or butyl group. Preferably, R' is a methyl, ethyl, propyl or isopropyl group; x represents an integer of from 1, 2, 3, or 1 to 10, 1 to 6 or 1 to 4.

In another embodiment, x is an integer from 1 to 10, R'' is H or CH$_3$ and R' is selected from the group consisting of H or straight or branched alkyls, such as methyl, ethyl, propyl, isopropyl etc.

Examples of readily available pH-dependent surfactants include but are not limited to those marketed under the tradename TRITON RW-Series by Dow Chemical Company, Midland, Mich., USA, such as for example TRITON RW-20, RW-50, RW-70, RW-100, RW-150.

Other examples of commercially available pH-dependent surfactants include but are not limited to those shown in table 1. Further examples of pH-dependent surfactants are described, for example in U.S. Pat. No. 4,605,773, which is incorporated herein by reference.

TABLE 1 pH - dependent surfactants available under the tradename GENAMIN from Clariant, Basel, CH

| GENAMIN | Chemical Class | Structure |
|---|---|---|
|  | Amine ethoxylates |  |
| T 200 | Tallow amine ethoxylates | R = tallow; x + y = 20 |
| T 150 |  | R = tallow; x + y = 15 |
| T 120 |  | R = tallow; x + y = 12 |
| T 020 |  | R = tallow; x + y = 2 |
| S 250 | Stearyl amine ethoxylates | R = stearyl; x + y = 25 |
| S 200 |  | R = stearyl; x + y = 20 |
| S 150 |  | R = stearyl; x + y = 15 |
| S 120 |  | R = stearyl; x + y = 12 |
| S 080 |  | R = stearyl; x + y = 8 |
| S 020 |  | R = stearyl; x + y = 2 |
| O 200 | Oleyl amine ethoxylates | R = oleyl; x + y = 20 |
| O 080 |  | R = oleyl; x + y = 8 |
| O 050 |  | R = oleyl; x + y = 5 |
| O 020 |  | R = oleyl; x + y = 2 |
|  | Alkylproyplene diamine ethoxylates | (CH$_2$CH$_2$O)$_z$H    (CH$_2$CH$_2$O)$_y$H<br>R—N—CH$_2$—CH$_2$—CH$_2$—N<br>                                                                         (CH$_2$CH$_2$O)$_x$H |
| LCL 030 |  | R = lauryl, x + y+ z = appr. 3.5 |
| OCL 030 |  | R = oleyl, x + y+ z = appr. 3.5 |
| TCL 030 |  | R = tallow, x + y+ z = appr. 3.5 |
|  | N,N-bisaminopropyl tallow fatty amine | CH$_2$CH$_2$CH$_2$NH$_2$<br>R—N<br>      CH$_2$CH$_2$CH$_2$NH$_2$ |
| 3119 |  | R = tallow |
|  | Tallow fatty propylene poly amine | R—(NH—CH$_2$CH$_2$CH$_2$)$_x$—NH$_2$ |
| TP3A |  | R = tallow; x = 2 |
| TP4A |  | R = tallow; x = 3 |
|  | Fatty propylene diamine | R—NH—CH$_2$CH$_2$CH$_2$—NH$_2$ |
| LAP 100; OAP 100, TAP100 |  | R = lauryl; R = oleyl;, R = tallow |

The pH-dependent surfactant may be aromatic or non-aromatic. The pH-dependent surfactant may be fluorinated or non-fluorinated but is preferably non-fluorinated.

Although not necessary, further anionic surfactants other than the fluorinated emulsifiers, and preferably non-fluorinated ones may be present in the dispersion or may be added to it.

The pH-dependent surfactant may have a critical micelle concentration (cmc) at room temperature of from about 10-3 to about 10-6 mol/l. The cmc and surface tension can be determined by standard methods, for example by the ring method using a tensiometer (Krüss tensiometer K100, Krüss GmbH, Hamburg Germany).

Process of Removing the Fluorinated Emulsifier from Fluoropolymer Dispersions

The fluorinated emulsifier is removed from the fluoropolymer dispersion containing it by contacting the dispersion with an anion exchange resin in the presence of the pH-dependent surfactant.

The pH-dependent surfactant is present during the anion exchange in an amount sufficient to stabilise the fluoropolymer dispersion. Typical amounts are at least about 0.02%, or at least about 0.5%, preferably at least about 1.0% by weight based on the solid content of the dispersion. The upper limit may be chosen such that the viscosity of the dispersion still allows covenient handling and processing and/or that the pH-dependent surfactant can be easily removed from the coagulated polymer or the dipersion. This amount may be up to about 100%, up to about 25% or up to about 10% by weight based on the solid content of the dispersion. Typically, the pH-dependent surfactant may be present in amounts from 0.5 to about 15 or from about 1 to about 7% by weight based on the solid content. The optimum effective amount can be easily determined b one skilled in the art through routine experimentation. For example, the destabilisation of the dispersion can be determined visibly by the occurrence of coagulation, or can be measured by pressure build-up at constant flow rate (or reduction of the flow rate at constant pressure) in the anion exchange resin.

When subjecting the dispersion to the anion exchange, the pH of the dispersion has a pH at which the pH-dependent surfactant is capable to stabilise the fluoropolymer dispersion. Typically, this is when the surfactant is in its non-ionic form.

Preferably, the anion exchange resin used in the process according to the invention is basic. The anion exchange resin may be a weak, medium strong or a strong basic. The terms strong, medium strong and weak basic anion exchange resin are defined in "Encyclopedia of Polymer Science and Engineering", John Wiley & Sons, 1985, Volume 8, page 347 and "Kirk-Othmer", John Wiley & Sons, 3rd edition, volume 13, page 687. Strong basic anion exchange resin typically contain quaternary ammonium groups, medium strong resins usually have tertiary amine groups and weak basic resins usually have secondary amines as the anion exchange functions. Examples of anion exchange resins that are commercially available for use in this invention include but are not limited to AMBERLITE® IRA-402, AMBERJET® 4200, AMBERLITE® IRA-67 and AMBERLITE® IRA-92 all available from Rohm & Haas, PUROLITE® A845 (Purolite GmbH) and LEWATIT® MP-500 (Bayer AG), LEWATIT® MP-62 (Bayer AG), or DOWEX 550A (Dow Chemical Company) or DOWEX MARATHON A2 (Dow Chemical Company).

The resin employed in the present invention may have a Gaussian distribution of bead sizes about the average bead diameter, the beads may be polydisperse or the beads may be monodisperse. The resin may be in a "non-fixed resin bed" or in a "fixed resin bed". In a fixed resin bed the ion-exchange resin is not agitated. Fixed resin bed typically covers column technology, in which the resin rests and removal of the substance occurs through a chromatographic process. The term non-fixed resin bed is used to indicate that the resin is agitated, for example, being fluidized, stirred or shaken.

The dimension of the ion exchange resin (volume of resin containing column) are adapted to the concentration of fluorinated emulsifier and volume of the fluoropolymer dispersion to be treated. In case of resins loaded with the pH-dependent surfactants, the volume of the resin and/or its loading degree is such that the amount of the pH-dependent surfactant that could be released from the resin is equal or preferably exceeds the amount of fluorinated emulsifier to be removed from the dispersion.

In accordance with the process of removing the fluorinated emulsifier, the fluoropolymer dispersion is contacted with an effective amount of anion exchange resin and for a time sufficient to reduce the level of fluorinated emulsifier to the desired level. It is also possible to contact the dispersion with more than one resin, for example a series of anion exchange resins according to the invention. As an alternative or in addition to adding the pH-dependent surfactant to the dispersion prior to the ion-exchange step, resins may be used that have been loaded with the pH-dependent surfactant and which release the pH-dependent surfactant during the ion-exchange. In this embodiment, the resins may be loaded with the same or a different pH-dependent surfactant that has been added to the dispersion prior to the ion-exchange.

The fluoropolymer dispersions may be contacted with the anion exchange resin by mildly agitating or not agitating the mixture of fluoropolymer dispersion and anion exchange resin. Ways to agitate include shaking a vessel containing the mixture, stirring the mixture in a vessel with a stirrer or rotating the vessel around its axel. The rotation around the axel may be complete or partial and may include alternating the direction of rotation. Rotation of the vessel is generally a convenient way to cause the agitation. When rotation is used, baffles may be included in the vessel. A further attractive alternative to cause agitation of the mixture of exchange resin and fluoropolymer dispersion is fluidizing the exchange resin. Fluidization may be caused by flowing the dispersion through the exchange resin in a vessel whereby the flow of the dispersion causes the exchange resin to swirl. Strong shear forces, however, may support coagulation of the dispersion and are preferably avoided.

Contacting of the dispersion with the resin can be practiced in a so-called batch-wise manner or in a continuous manner. In a batch-wise process, a vessel is charged with the anion exchange resin and fluoropolymer dispersion. The mixture in the vessel is then agitated for a time sufficient to reduce the residual fluorinated emulsifier to the desired level after which the dispersion and exchange resin are separated, e.g. through filtration. The vessel may then be charged anew with fluoropolymer dispersion and exchange resin and the process is then repeated.

In a continuous process, fluoropolymer dispersions from which fluorinated emulsifier is to be removed may be continuously added at one end to a (preferably midly agitating) vessel that contains an anion exchange resin, and fluoropolymer dispersion having a reduced amount of fluorinated emulsifier may be withdrawn at another end of the vessel in a continuous fashion. In a continuous process, the equipment will be designed such that the residence time of the dispersion in the vessel is sufficient to reduce the amount of fluorinated emulsifier to the desired level. In a particular embodiment of a continuous process, a plurality, e.g. 2 or more, (preferably mildly agitating) vessels each charged with anion exchange resin may be used. Accordingly, the fluoropolymer dispersion may be continuously added and withdrawn from the first vessel. The fluoropolymer dispersion from the first vessel may be fed continuously in the next vessel from which it is continuously withdrawn and this process can be repeated if more than 2 vessels are used. If a plurality of vessels is used, they are typically arranged in a cascading arrangement.

Anion exchange resins charged with fluorinated emulsifier can be regenerated by eluting the anion exchange resin according to the processes disclosed in for example U.S. Pat. No. 4,282,162, WO 01/32563 and EP 1 069 078 and the fluorinated emulsifer may then be recovered from the eluate. The recovered fluorinated emulsifer may thereafter be re-used for example in an aqueous emulsion polymerization of one or more fluorinated monomers to produce a fluoropolymer.

The Fluoropolymer Dispersions

Accordingly, there is also provided a fluoropolymer raw dispersion and a concentrated dispersion comprising from about 5% to about 35% (raw dispersion) or from about 35% to about 70% by weight of fluoropolymer (concentrated dispersion), at least about 0.02%, preferably at least about 0.5%, more preferably at least about 1.0% or from about 0.02% to about 20%, or from about 0.5% to about 12% or from about 1 to about 8% by weight based on the solid content of the dispersion of the pH-dependent surfactant.

The dispersion may further comprise no or less than about 0.02%, preferably less than about 0.01%, more preferably less than about 0.005% by weight based on the solid content of the dispersion of a fluorinated emulsifier.

The dispersions are suitable for the preparation of fluoropolymer coatings and fluoropolymer coating compositions. Therefore, further coating ingredients may be added to the dispersion. Consequently, the dispersions may also comprise further coating ingredients. Typical coating ingredients may be for example:

further polymers, such as further fluorinated polymers, non-fluorinated polymers, including but not limited to polysulfones, polyethersulfones, polyetherketones, polyamides, polyimides, polyether imides, polyamide-imides, polybismaleimides, polyacetals, silicones, silicates or mixture thereof which may improve the rheology of the dispersion or the resulting coating or may improve the adhesion of the fluoropolymer coating to the substrate; or fillers, such as, for example, carbon fibers, glass fibers, glass spheres, ceramic fibers, borosilicates, silicates and mixtures thereof, or metal particles or agglomerates, such as for example silver particles, gold particles, iron particles etc, or carbon particles or graphite and mixtures thereof, for example for the preparation of catalytic surfaces, electroconducting or heat conducting surfaces or electrode surfaces (as for example disclosed in U.S. Pat. No. 4,603,118); or friction reducing agents such as sulphate salts or sulfide salts such as for example metal salts such as molybdenium sulfide, zinc sulfide, barium sulphate or mixtures thereof, for example for the preparation of bearings (as disclosed in U.S. Pat. No. 4,847,135); or pigments, such as for example soot, carbon black or titanium dioxide.

The substrate to be coated may have a smooth or porous surface. The substrate may be an inorganic composite such as enamel, ceramics or, preferably, metals. Suitable metals include, but are not limited to, for example, steel, stainless steel, bronze, aluminium, iron or copper. Also suitable substrates are fibres, such as textiles, paper, glass fabrics or fabrics containing organic polymers, such as for example polyester, polypropylene, polyethylene, or poylacetates. Prior to application of the composition to these substrates, the substrate may be roughened to further enhance adhesion of the coating to the substrate. Typically, sand blasting or etching is used to roughen a metal substrate.

A particular suitable application of the fluoropolymer dispersion is the preparation of bearings such as, for example, sliding-contact bearings, bush bearings, friction-type contact bearings etc. Another particular suitable application of the fluoropolymer dispersion is the preparation of electrodes.

Therefore, there is also provided the use of the composition obtainable by the process described above for coating a substrate. Typically, the substrate comprises a metal and more typically, the substrate is a bearing of an electrode.

Process for Preparing Coating Compositions

The dispersions described above may be used for coating a substrate. They can be applied to the substrate as dispersion and subsequently sintered. Preferably the coating composition is not a dispersion but is a solid mass or a paste. Preferably the coating composition is a coagulum (i.e. the fluoropolymer phase obtained by destabilising the dispersion). The coagualum may be prepared by a) destabilizing the dispersion b) (optionally) adding one or more further coating ingredients to the dispersion c) coagulating the fluoropolymer d) collecting the coagulum, wherein a) b) c) and d) can be carried out simultaneously or subsequently. It is also possible to carry our a) before, after or simultaneously with b).

Detabilizing the dispersion is typically carried out by reducing the pH to a level at which the pH-dependent surfactant has a reduced surface activity. Typically, this is the case when the surfactant is in its cationic form.

Coagulating the fluoropolymer may already be achieved by reducing the pH as described above. However, the pH-reduction may not necessarily lead to an immediate coagulation. Coagulation may be initiated or supported in various ways: for example, shear force may be applied, the ionic strength of the dispersion may be increased by adding further cations ("salting out") or by adding organic solvents or other flocculation agents such as polycations etc.

Organic solvents may also be added after or during the coagulation which may help to increase the particle sizes of coagulate and/or may lead to a further removal of water from the coagulum ("agglomeration"). Preferred organic solvents are those that are not soluble in water or only soluble in water up to an amount of 15% by weight at room temperature and ambient pressure. Typical organic solvents include, for example, toluene, xylene, carbohydrates with boiling points from about 80 to 110° C., liquid mineral oils, liquid parrafines etc.

Salts for "salting out" are preferably water soluble salts, including for example, magnesium chloride, sodium chloride, potassium chloride, ammonium chloride or the corresponding nitrates, sulfates or mixtures thereof.

The coagulate can be collected by standard methods such as filtration, sedimentation, centrifugation, or decantation.

The coagulum may be applied to the substrate by standard techniques such as, for example, calendering or rolling etc. Typically, the coagulum is applied to roughened metal substrates as described above.

The invention is further illustrated with reference to the following examples, without however the intention to limit the invention thereto.

METHODS AND EXAMPLES

Particle Sizes

Particle sizes of fluoropolymer dispersions may be determined by dynamic light scattering using a Malvern Zetasizer 1000 HSA in according to ISO/DIS 13321. Prior to the measurements the polymer latexes were diluted with 0.001 mol/L KCl solution. The measurements are made at 25° C.

Fluorinated Emulsifier Content:

The content of fluorinated emulsifier can be measured by gas chromatography (head space), by converting the emulsifier into the methyl ester (using sulfuric acid and methanol) and using the methyl ester of perfluorododecanoic acid as internal standard.

Solid Content:

The solid content was determined according to ISO 12086 (2 h 120° C., 35 min 380° C.).

Surfactant Content:

Content of surfactant in the dispersion can be determined by using HPLC. In case of highly concentrated dispersion dilution may be required.

Comparative Example 1 (C1)

To 500 g of a 35% solid containing aqueous PTFE dispersion prepared by emulsion polymerization of tetrafluoroethylene using ammonium perfluoro octanoic acid (APFO) as emulsifier and containing 1500 ppm APFO were added 5% wt. (based on the solids) of the non-ionic surfactant Triton X-100 (Dow Chemical Comp.) under stirring. The dispersion had a pH of 3. The dispersion was then submitted to anion exchange to reduce the APFO. Anion exchange was carried out in a standard ion exchange column (5×50 cm) using 400 ml of AMBERLITE™ IRA 402 (available from Rohm & Haas) as anion exchange resin. The resin was brought in its OH⁻ form by adjusting it with NaOH solution. The resulting dispersion had an APFO content of 6 ppm.

26 g of zinc sulphide (filler material) were added to the dispersion under mild stirring. Then 7 ml of an aqueous ammonium sulphate solution (40% wt of ammonium sulphate) were added upon which coagulation started. The coagulation was supported by applying shear force (Turrax mixer, 8,000 rpm, 15 minutes). The coagulated polymer formed a slurry without any phase separation. Addition of 90 ml xylene did not lead to a phase separation neither did it lead to an agglomeration of the coagulum.

Example 1

To 500 g of the same PTFE dispersion of the comparative example above were added 5% wt (based on the solid content of the dispersion) of an aqueous solution containing 25% by wt of TRITON RW 150 (an ethoxylated amine available from Dow Chemical Company, Midland, Mich., USA). The pH of the dispersion was adjusted to pH 10 by adding an aqueous ammonia solution (25% wt of ammonia). The dispersion was then submitted to the same ion-exchange process as described in C1 above. The resulting dispersion had an APFO content of 5 ppm. The pH of the dispersion was then reduced to a pH of 3 by adding a 10% aqueous oxalic acid solution. Then 26 g of zinc sulphide were added to the dispersion under mild stirring. The salt concentration was increased by adding 7 ml of an aqueous ammonium sulphate solution (40% wt of ammonium sulphate) by which coagulation was initiated. Coagulation was completed by applying shear force using a Turrax mixer (8,000 rpm, 15 minutes). The coagulated dispersion showed a distinct phase separation. The coagulum could be agglomerated by adding 90 ml of xylene.

The invention claimed is:

1. An aqueous fluoropolymer dispersion comprising:
    i) from about 5% to about 70% by weight of a fluoropolymer, based on the weight of the dispersion, and
    ii) at least about 0.02% by weight of a pH-dependent surfactant, based on the solid content of the dispersion, the pH-dependent surfactant having, depending on the pH of the dispersion, either a cationic or a non-ionic form and wherein the pH-dependent surfactant is capable in its non-ionic form of stabilising the dispersion and coagulating the dispersion in its cationic form.

2. The aqueous fluoropolymer dispersion according to claim 1 further comprising less than about 0.02% by weight of a fluorinated emulsifier, based on the weight of the solid content of the dispersion.

3. A fluoropolymer coating composition comprising the aqueous fluoropolymer dispersion according to claim 1.

* * * * *

UNITED STATES PATENT AND TRADEMARK OFFICE
CERTIFICATE OF CORRECTION

PATENT NO. : 8,466,231 B2  
APPLICATION NO. : 12/420108  
DATED : June 18, 2013  
INVENTOR(S) : Michael Dadalas et al.

It is certified that error appears in the above-identified patent and that said Letters Patent is hereby corrected as shown below:

Column 2  
Title Page, Other Publications, Line 1, Delete "Polymericzation" and insert -- Polymerization --, therefor.  
Title Page, Abstract, Line 4, Delete "dispersion" and insert -- dispersions --, therefor.

In the Specification:  
Column 4  
Line 6, Delete "tetrafluorethylene" and insert -- tetrafluoroethylene --, therefor.  
Line 45, Delete "and or" and insert -- and/or --, therefor.

Column 6  
Line 67, Delete "to 6" and insert -- 1 to 6 --, therefor.

Column 8  
(Table 1), Line 21, Delete "Alkylproyplene" and insert -- Alkylpropylene --, therefor.

Column 9  
Line 20, Delete "covenient" and insert -- convenient --, therefor.  
Line 22, Delete "dipersion." and insert -- dispersion. --, therefor.

Column 10  
Line 53, Delete "midly" and insert -- mildly --, therefor.

Column 11  
Line 7, Delete "emulsifer" and insert -- emulsifier --, therefor.  
Line 8, Delete "emulsifer" and insert -- emulsifier --, therefor.  
Line 52, Delete "molybdenium" and insert -- molybdenum --, therefor.  
Line 65, Delete "poylacetates." and insert -- polyacetates. --, therefor.

Signed and Sealed this  
Nineteenth Day of November, 2013

Teresa Stanek Rea  
*Deputy Director of the United States Patent and Trademark Office*

CERTIFICATE OF CORRECTION (continued)
U.S. Pat. No. 8,466,231 B2

<u>Column 12</u>

Line 20 (Approx.), Delete "coagualum" and insert -- coagulum --, therefor.

Line 31, Delete "Detabilizing" and insert -- Destabilizing --, therefor.